(12) United States Patent
Fukushima et al.

(10) Patent No.: US 7,868,980 B2
(45) Date of Patent: Jan. 11, 2011

(54) DISPLAY APPARATUS

(75) Inventors: Hiroshi Fukushima, Yamatokoriyama (JP); Tomoo Takatani, Nara (JP); Koji Yabuta, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 390 days.

(21) Appl. No.: 11/910,870

(22) PCT Filed: Mar. 23, 2006

(86) PCT No.: PCT/JP2006/305874
§ 371 (c)(1),
(2), (4) Date: Oct. 5, 2007

(87) PCT Pub. No.: WO2006/109498
PCT Pub. Date: Oct. 19, 2006

(65) Prior Publication Data
US 2009/0279005 A1 Nov. 12, 2009

(30) Foreign Application Priority Data
Apr. 8, 2005 (JP) ............................. 2005-112890

(51) Int. Cl.
*G02F 1/139* (2006.01)
(52) U.S. Cl. ..................................... 349/129
(58) Field of Classification Search ................. 349/129
See application file for complete search history.

(56) References Cited

U.S. PATENT DOCUMENTS

| | | | |
|---|---|---|---|
| 5,853,822 A | * | 12/1998 | Lyu ............................. 428/1.2 |
| 5,883,739 A | | 3/1999 | Ashihara et al. |
| 6,445,434 B2 | | 9/2002 | Takato et al. |
| 2005/0001787 A1 | * | 1/2005 | Montgomery et al. ......... 345/6 |

FOREIGN PATENT DOCUMENTS

| | | |
|---|---|---|
| GB | 2 405 516 A | 3/2005 |
| GB | 2 405 517 A | 3/2005 |
| GB | 2 405 518 A | 3/2005 |
| JP | 2005-321449 A | 11/2005 |

OTHER PUBLICATIONS

Official communication issued in the International Application No. PCT/JP2006/305874, mailed on May 2, 2006.

* cited by examiner

*Primary Examiner*—Jerry T Rahll
(74) *Attorney, Agent, or Firm*—Keating & Bennett, LLP

(57) ABSTRACT

In a parallax barrier DV (Dual View) display apparatus, a TN (Twisted Nematic) liquid crystal display panel is adopted as a display device for display images. The TN liquid crystal display panel includes a pair of opposing substrates, a liquid crystal layer sandwiched therebetween, orientation films arranged to orient liquid crystal molecules constituting the liquid crystal layer, and electrodes arranged to independently apply electric fields to areas of the liquid crystal layer which correspond to respective pixels. The orientation films are oriented in such a manner that liquid crystal molecules in the aforesaid areas are oriented so that display directions of the pixels are parallel or substantially parallel to a viewing angle direction. This arrangement improves image separation capability in all display directions, in a DV (Dual View) display apparatus displaying different images in respective display directions, by a single display screen.

7 Claims, 13 Drawing Sheets

FIG. 8
DISPLAY FOR DRIVER'S SEAT
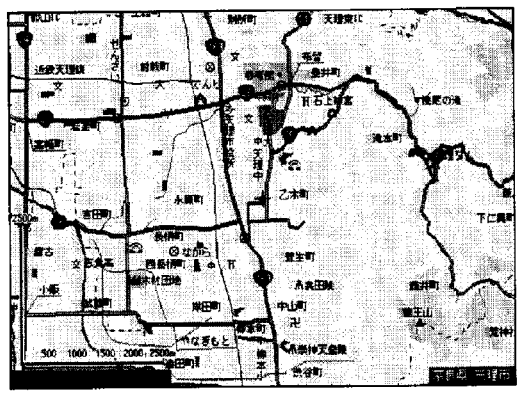
DISPLAY FOR PASSENGER SEAT
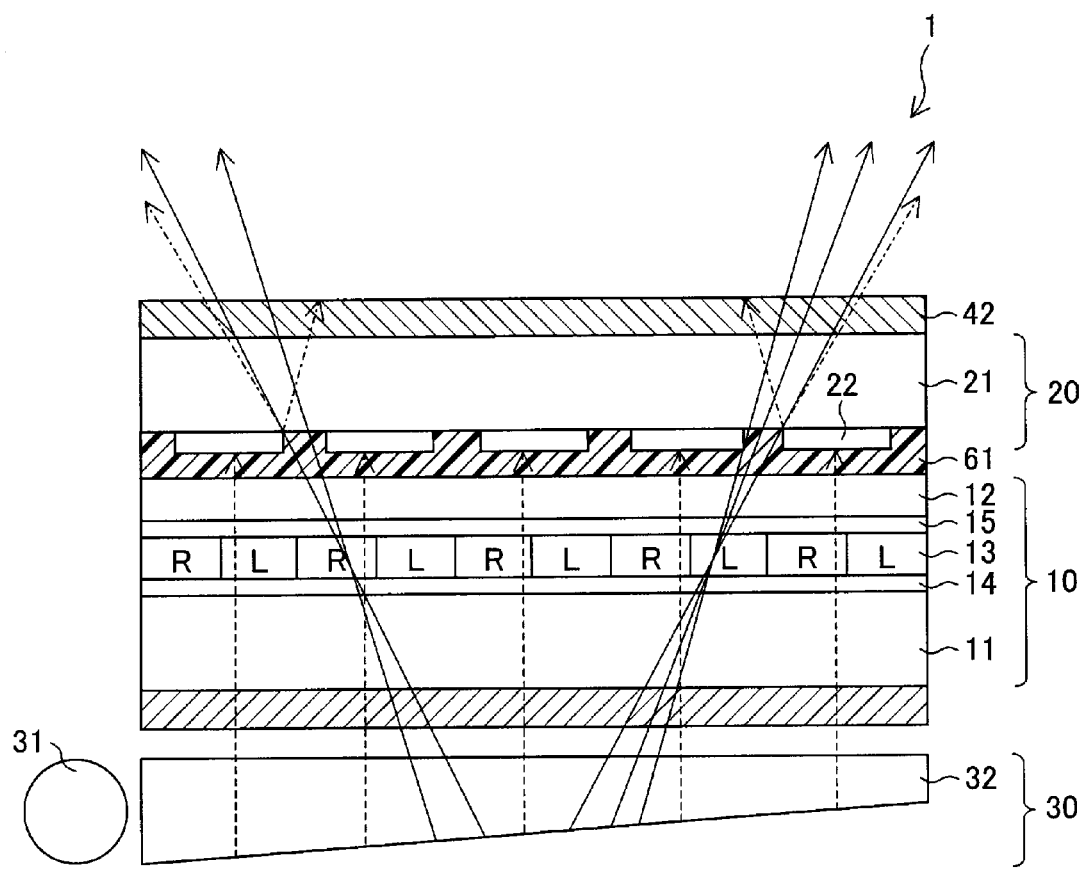

FIG. 10
DISPLAY FOR DRIVER'S SEAT
DISPLAY FOR PASSENGER SEAT
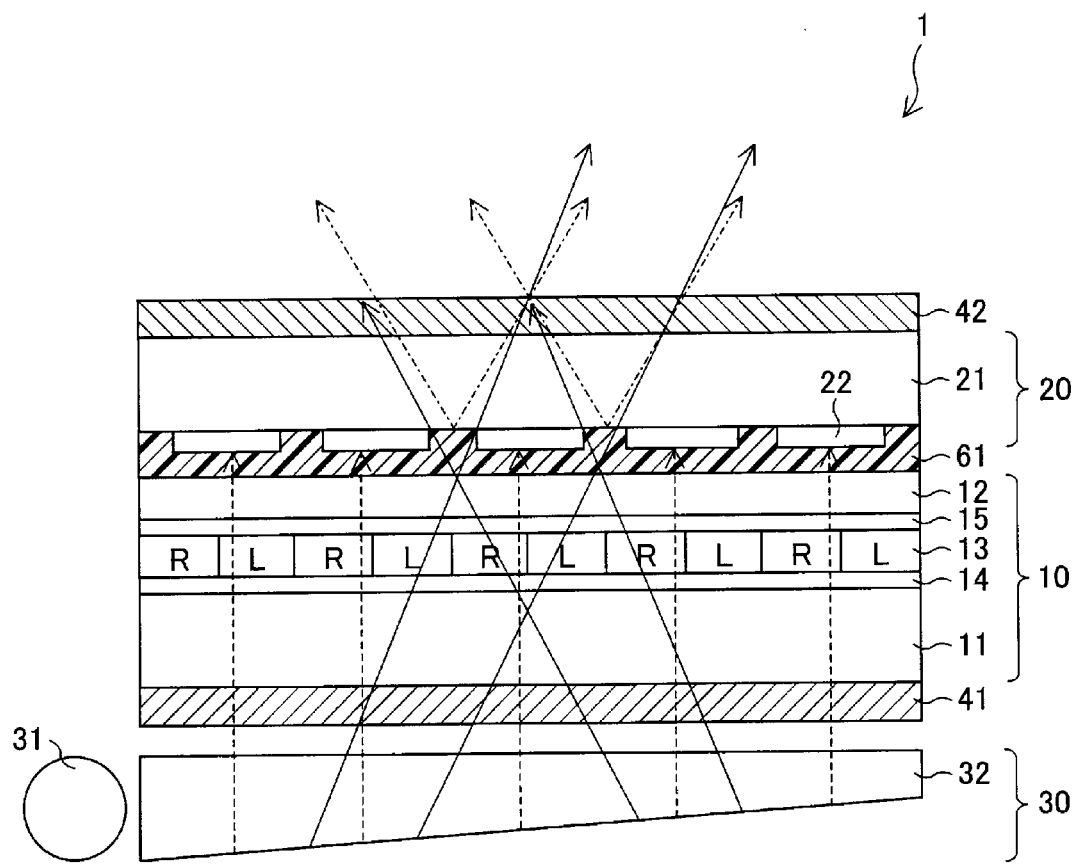

FIG. 12 – PRIOR ART
DISPLAY FOR DRIVER'S SEAT
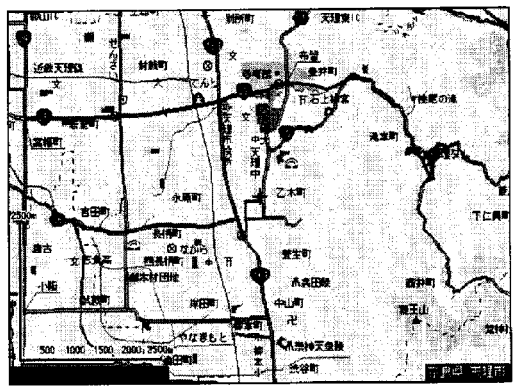
DISPLAY FOR PASSENGER SEAT
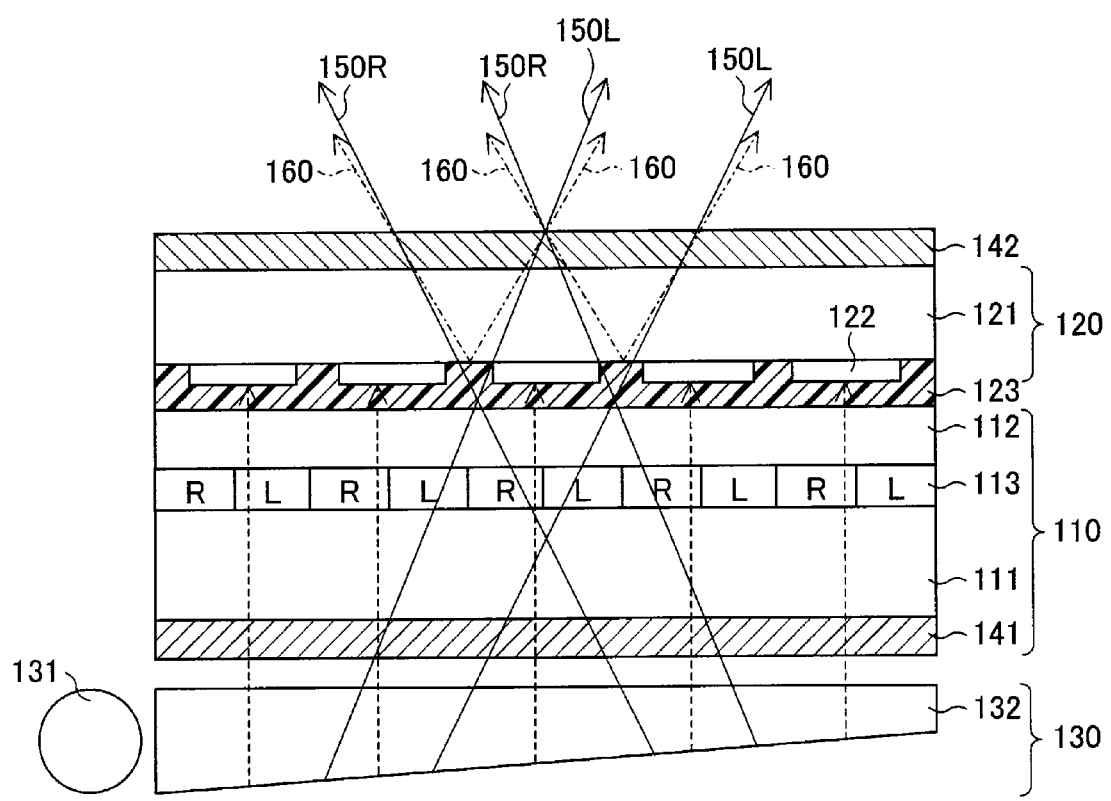

FIG. 13
PRIOR ART
DISPLAY FOR DRIVER'S SEAT
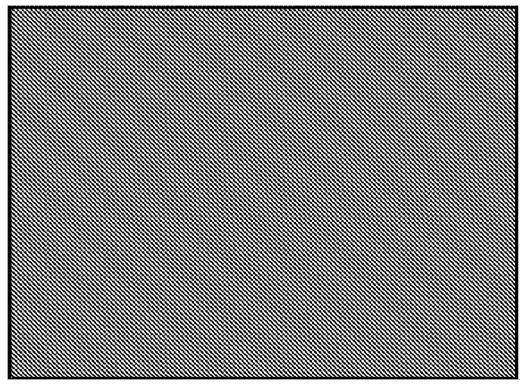
DISPLAY FOR PASSENGER SEAT
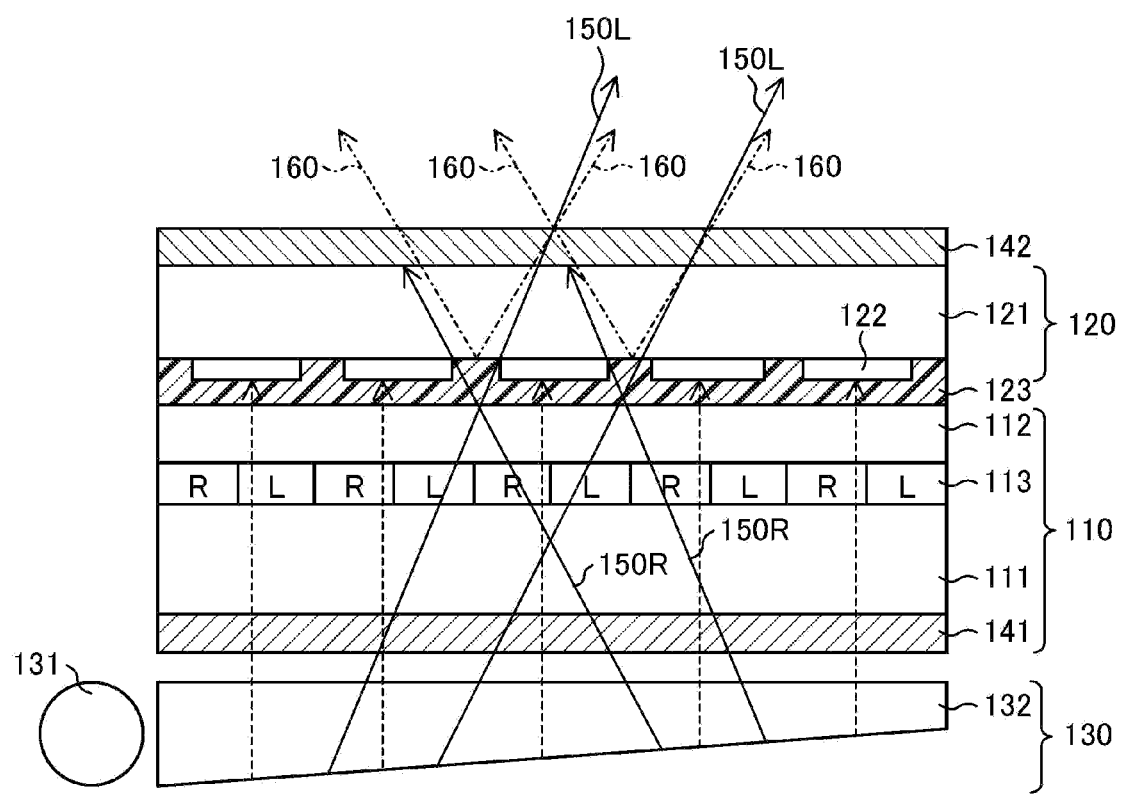

DISPLAY APPARATUS

BACKGROUND OF THE INVENTION

1. Field of the Invention

The present invention relates to a display apparatus displaying, on a common display screen, different images in respective directions.

2. Description of the Related Art

There have been proposed display apparatuses which can display, on a common display screen, different images in respective directions (i.e., DV (dual view) display).

FIG. 11 is a schematic cross section showing an example of such display apparatuses. The display apparatus shown in the figure includes a display panel 110, a barrier section 120, a backlight 130, and polarizing plates 141 and 142.

The backlight 130 is provided with a light source 131 and a reflection section 132 as shown in FIG. 11, and causes the display panel 110 to be irradiated with light in such a manner that the reflection section 132 reflects light emitted from the light source 131.

The display panel 110 is an active matrix liquid crystal display panel in which a liquid crystal layer 113 is sandwiched between a TFT substrate 111 and a CF substrate 112 opposing to each other.

The surface of the TFT substrate 111 is provided with plural data signal lines and plural scanning signal lines intersecting with the respective data signal lines. At each of the intersections between the data signal lines and scanning signal lines, a pixel is formed (none of these members are illustrated). The data signal lines and the scanning signal lines are connected to a source driver and a gate driver (none of them are illustrated), respectively. With this arrangement, a drive voltage is independently applied to each pixel so that alignment of liquid crystal molecules in each pixel area of the liquid crystal layer 113 is changed, and hence image display is achieved.

As shown in FIG. 11, the pixels are arranged in such a manner that, along the data signal lines, lines L of pixels for image display for the left side of the display apparatus and lines R of pixels for image display for the right side of the display apparatus are alternately provided.

The CF (Color Filter) substrate 112 has a color filter layer (not illustrated).

The TFT substrate 111 and the CF substrate 112 are provided with orientation films (not illustrated) on their surfaces opposing to each other. The orientation films are oriented to orthogonal directions, and each orientation film is rubbed in a direction in parallel to the substrate surface. The polarizing plate 141 is provided on the backlight 130 side of the TFT substrate 111 in such a manner that the absorption axis direction of the polarizing plate 141 is parallel to the orientation of the orientation film on the TFT substrate 111. The polarizing plate 142 is provided on the display surface side of the barrier section 120 (i.e., on the opposite side to the backlight 130), in such a manner that the absorption axis of the polarizing plate 142 is orthogonal to the absorption axis of the polarizing plate 141. With this arrangement, a drive voltage applied to each pixel is changed so that each line of pixels can perform display for each display direction.

The barrier section 120 is constituted by a barrier glass 121, a barrier light shielding layer 122, and a resin layer 123. The barrier light shielding layer 122 shields against parts of light emitted from the backlight 130 and passing through the display panel 110. The resin layer 123 is formed on the barrier glass 121 so as to cover the barrier light shielding layer 122, and connects the barrier section 120 with the display panel 110.

The barrier light shielding layer 122 is provided so as to form stripes corresponding to the respective lines of pixels. That is to say, the stripes of the barrier light shielding layer 122 are formed to shield against parts of light emitted from the backlight 130 and passing through the lines of pixels, in such a manner as (i) to cause the lines L of pixels for the left side to be observable from the left side of the display apparatus but not to be observable from the right side of the display apparatus, and (ii) to cause the lines R of pixels for the right side to be observable from the right side of the display apparatus but not to be observable from the right side of the display apparatus. As a result, the display apparatus can display different images for the left and right sides of the display apparatus (i.e., can perform DV display).

In the meanwhile, for example, U.S. Pat. No. 5,883,739 discloses a vehicle information display apparatus in which left-viewpoint image and right-viewpoint image for the driver's seat and left-viewpoint image and right-viewpoint image for the passenger seat are alternately arranged by pixel and synthesized, so that a stereoscopic image is viewable from the driver's seat and the passenger seat.

U.S. Pat. No. 5,883,739 also teaches that, the left-viewpoint and right-viewpoint images for the driver's seat are made blank and synthesized with the left-viewpoint and right-viewpoint images for the passenger seat, with the result that a stereoscopic image cannot be viewed from the driver's seat and only viewable from the passenger seat.

U.S. Pat. No. 6,445,434 discloses a liquid crystal display apparatus including a liquid crystal layer, an orientation film by which the liquid crystal layer is oriented, and a drive circuit driving the liquid crystal layer, wherein the orientation film is divided into plural areas each of which has a visible size and a particular shape, and orientations of neighboring areas are different from one another.

In this liquid crystal display apparatus, a displayed content is hardly viewable in all directions except a case where the liquid crystal display apparatus is viewed head-on, on account of the arrangement above. Also, since a predetermined pattern is viewed in directions other than the head-on direction, a figure or a product name may be presented to the viewer.

U.S. Pat. No. 6,445,434 also teaches that two liquid crystal layers (upper liquid crystal layer and lower liquid crystal layer) are provided, and the lower liquid crystal layer which is farther away from the viewer is used for regular display whereas the upper liquid crystal layer is used for switching between a state where the display by the lower liquid crystal layer is viewable in directions other than the head-on direction and a state where the display is not viewable in directions other than the head-on direction.

According to this technique, the upper liquid crystal layer has plural areas with different orientations, and the areas are provided so that neighboring areas have different orientations. The upper liquid crystal layer is used for displaying a predetermined figure when viewed in directions other than the head-on direction. With this arrangement, when the upper liquid crystal layer is in a halftone display state, an image displayed on the lower liquid crystal layer is viewable head-on but, in directions other than the head-on direction, the image on the lower liquid crystal layer is blocked by the figure on the upper liquid crystal layer and hence hardly viewable. After an electric field is applied to the upper liquid crystal layer so that liquid crystal molecules in the upper liquid crystal layer are upright, the image on the lower liquid crystal layer becomes viewable in directions other than the head-on direction.

In the technique of U.S. Pat. No. 6,445,434, however, only a predetermined pattern is viewable in directions other than the head-on direction, or at best, only either the same image as the head-on direction or a predetermined figure is viewable in directions other than the head-on direction. It is therefore impossible to display, by a shared display screen, different images (e.g., moving images) in plural directions.

Also, in the display apparatus of U.S. Pat. No. 5,883,739 and the display apparatus shown in FIG. 11, when an image is viewed in one direction, an image for a different display direction may overlap the image. In short, so-called crosstalk may occur.

That is to say, in the display apparatus of U.S. Pat. No. 5,883,739 and FIG. 11, sets of image light for respective display directions are separated by a parallax barrier which is a conventionally-proposed image separation device. However, when different images are displayed in plural directions by parallax barrier, an image for one display direction may leak to the other direction.

Why such crosstalk occurs will be explained with reference to FIG. 12. FIG. 12 illustrates an example of a display state in which the conventional DV display apparatus shown in FIG. 11 is used as an in-vehicle display apparatus and different images are displayed for the driver's seat and the passenger's seat, respectively.

As shown in FIG. 12, in the case where different images are displayed for the driver's seat (right side) and for the passenger seat (left side), among light 150R having passed through lines R of pixels for the right side, sets of light towards the driver's seat reach the driver's seat side through the gaps of the barrier light shielding layer 122, whereas sets of light towards the passenger seat are blocked by the barrier light shielding layer 122. On the other hand, among light 150L having passed through lines L of pixels for the left side, sets of light towards the driver's seat reach the passenger seat through the gaps of the barrier light shielding layer 122, whereas sets of light towards the driver's seat are blocked by the barrier light shielding layer 122. This theoretically makes it possible to separate images (image lights) displayed for the driver's seat and the passenger seat from one another.

In reality, however, scattered/diffracted light 160 is generated because of scatter and diffraction of light at the end surface of the barrier light shielding layer 122, multiple reflections at the layers of the display apparatus, and the like. The scattered/diffracted light 160 is emitted to the display directions so that crosstalk occurs and the separation capability of images is decreased. In other words, while the parallax barrier theoretically makes it possible to separate image lights towards the respective display directions from one another, crosstalk occurs in reality because of diffraction of light at the end surface of the barrier, multiplex reflection at the layers of the display, and the like.

Such crosstalk is particularly easily recognizable when display for the driver's seat is black display. FIG. 13 illustrates a case where black display is provided to the driver's seat and an image is only provided to the passenger seat, using the DV display apparatus shown in FIG. 11.

As shown in the figure, in the case where display for the driver's seat is in non-display mode, light 150R having passed through the lines R of pixels for the right side is blocked by the polarizing plate 142. With this, display for the driver's seat is supposed to be non-display. In reality, however, scattered/diffracted light 160 is emitted to the driver's seat. As a result, the image for the passenger seat may be overlapped with the black display for the driver's seat, and a double image may be recognizable.

As such, an in-vehicle DV display apparatus may be required to perform, while the vehicle is running, black display for the driver's seat (i.e., non-display for the driver's seat) and display an image only for the passenger seat. In the conventional art, an image for the passenger seat may vaguely appear on the black display for the driver's seat, and a double image may be recognized from the driver's seat.

SUMMARY OF THE INVENTION

In order to overcome the problems described above, preferred embodiments of the present invention improve image separation capability in at least one display direction in a display apparatus which can display different images in plural display directions by using a common display screen.

A display apparatus according to a preferred embodiment of the present invention includes a display device in which plural pixels for displaying images in predetermined directions are disposed in a predetermined order in accordance with the directions of displaying the images; and a light shielding element arranged to prevent light emitted from the pixels from being viewed in directions different from the display directions of the pixels, the display device including a pair of substrates opposing each other; a liquid crystal layer sandwiched between the pair of substrates; an orientation member arranged to orient liquid crystal molecules constituting the liquid crystal layer; and an electrode arranged to apply electric fields corresponding to images, which are displayed by the pixels, to areas of the liquid crystal layer, the areas corresponding to the pixels, and the orientation member orienting the liquid crystal molecules in the areas so that the display directions of the pixels are parallel or substantially parallel to a viewing angle direction.

In this specification, the viewing angle direction is a direction to which the transmittance increases and the anti-viewing angle direction is a direction to which the transmittance decreases, when the display surface is viewed in directions tilting for the same angles from the direction vertical to the display surface towards the directions parallel or substantially parallel to the display surface. For example, when the transmittance in the case where the display surface is viewed in a direction tilting at an angle (e.g., approximately 30°) on the right side of the direction vertical to the display surface is higher than the transmittance in the case where the display surface is viewed in a direction tilting at the same angle (e.g., approximately 30°) on the left side, the viewing angle direction is in the leftward direction. In this case, the rightward direction is the anti-viewing angle direction.

According to the arrangement above, the pixels of the display device have a viewing angle direction corresponding to the display directions of the respective pixels. In other words, the areas of the liquid crystal layer, which correspond to the respective pixels, are provided so that the display directions of the pixels are parallel or substantially parallel to the viewing angle direction. As a result, light emitted from the pixels can be easily emitted in the display direction of the pixels but cannot be easily emitted in other display directions. As a result, crosstalk is reduced in all display directions on account of the orientation division which prompts light to travel in desired directions, in addition to the separation capability of image light by the light shielding member. In short, the display quality is improved in all display directions and hence the visibility is improved.

These and other additional elements, characteristics, features, advantages and strengths of the present invention will be made clear by the detailed description of preferred embodiments below with reference to the drawings.

BRIEF DESCRIPTION OF DRAWINGS

FIG. 8 shows display on the display apparatus of a preferred embodiment of the present invention, in the case where different images are displayed for the driver's seat and the passenger seat, respectively.

FIG. 10 shows display on the display apparatus of a preferred embodiment of the present invention, in the case where display for the driver's seat is set to non-display and an image is displayed only for the passenger seat.

FIG. 12 shows display on the conventional DV display apparatus, in a case where different images are displayed for the driver's seat and the passenger seat, respectively.

FIG. 13 illustrates display on the conventional DV display apparatus, in a case where display for the driver's seat is set to non-display and an image is displayed only for the passenger seat.

DETAILED DESCRIPTION OF PREFERRED EMBODIMENTS

Figure 1:
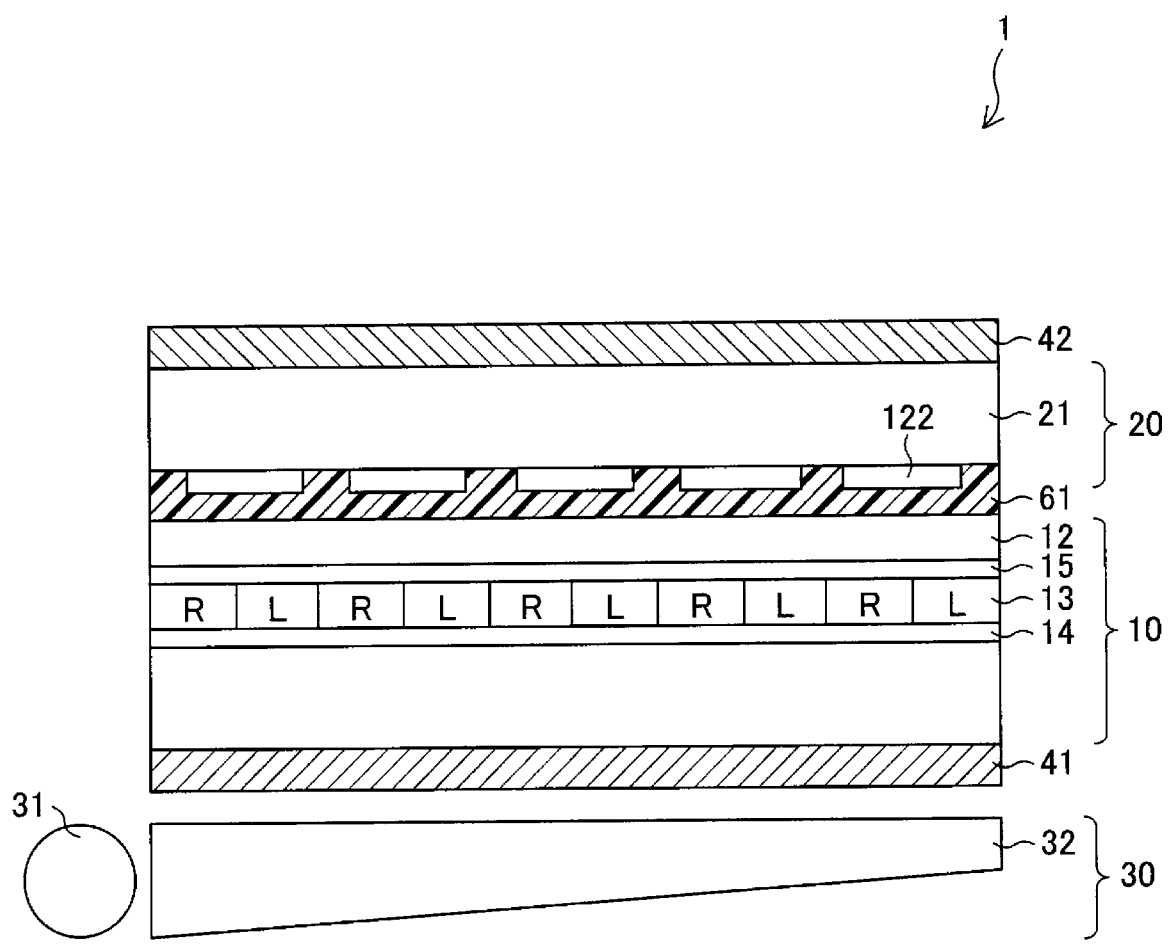
FIG. 1 is a pattern diagram outlining a display apparatus of a preferred embodiment of the present invention.

The following will describe preferred embodiments of the present invention with reference to the figures. FIG. 1 is a cross section outlining a display apparatus 1 which is a display apparatus of the present preferred embodiment.

Figure 2:
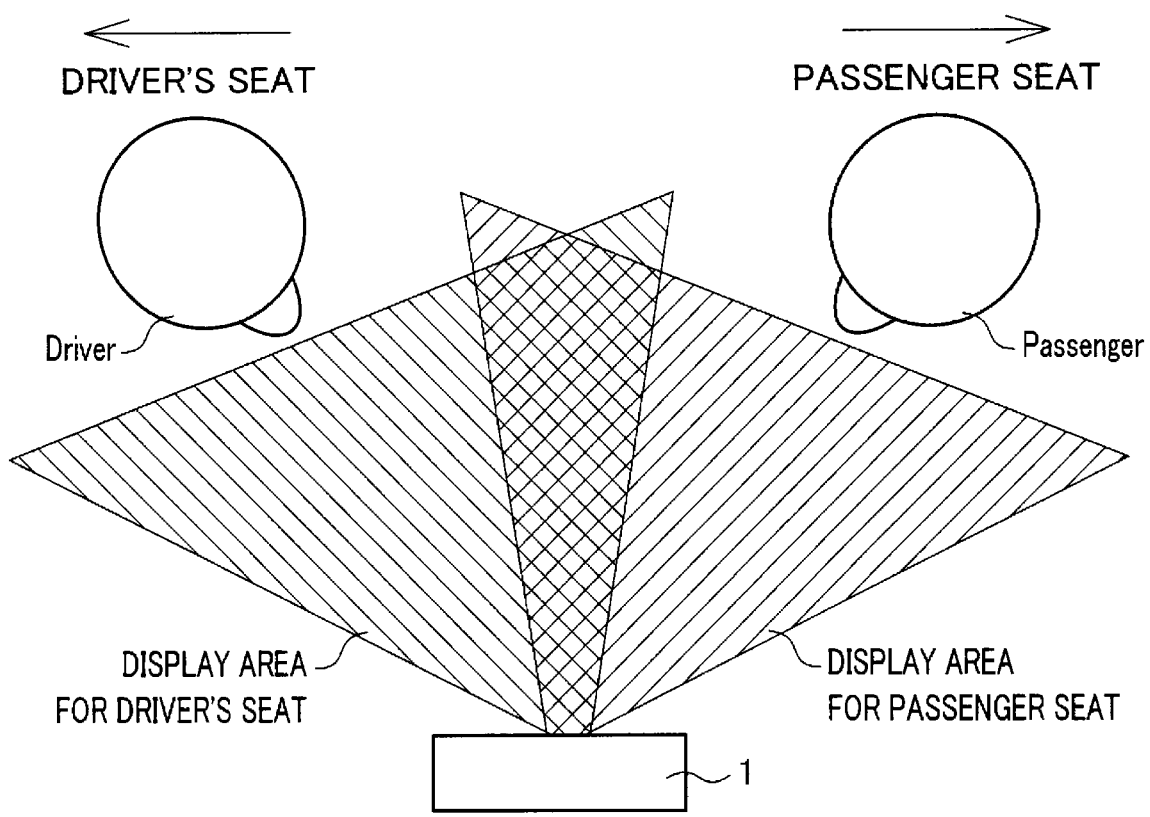
FIG. 2 schematically illustrates display on the display apparatus of a preferred embodiment of the present invention.

The display apparatus 1 preferably is an in-vehicle display mounted to an automobile (vehicle). FIG. 2 schematically illustrates display on the display apparatus 1. As shown in the figure, the display apparatus 1 is capable of displaying (DV-displaying) different images for the driver's seat (to the driver's seat direction) and for the passenger seat (to another direction), respectively. In the display apparatus 1, while the vehicle is running, display for the driver's seat is set to non-display and hence display is performed only for the passenger seat. In this specification, "non-display" indicates that nothing is virtually displayed by, for example, wholly displaying black color.

As shown in FIG. 1, the display apparatus 1 includes a display device in the form of a display panel 10, a barrier section 20, a backlight 30, and polarization plates 41 and 42.

The backlight 30 includes a light source 31 and a reflection section 32 as shown in FIG. 1. Light emitted from the light source 31 is reflected by the reflection section 32 so that the light irradiates the display panel 10. Examples of the light source 31 include LED (Light Emitting Diode), CCFT (Cold Cathode Fluorescent Tube), and CCFL (Cold Cathode Fluorescent Lump).

The display panel 10 preferably is an active matrix liquid crystal display panel in which a liquid crystal layer 13 made of nematic liquid crystal is sandwiched between a TFT substrate 11 and a CF substrate 12 which oppose one another.

Figure 3:
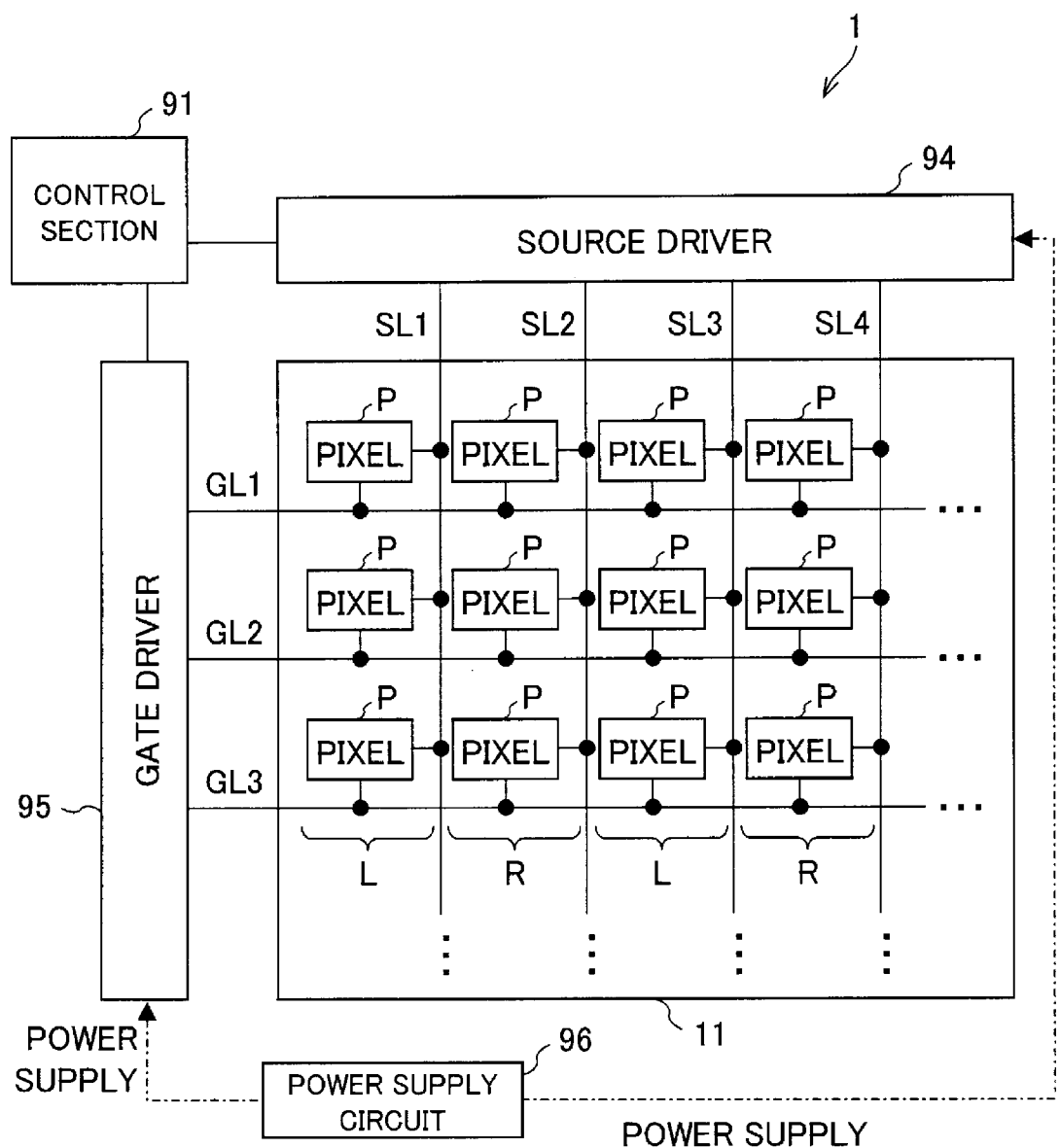
FIG. 3 is a block diagram outlining the display apparatus of a preferred embodiment of the present invention.
Figure 4:
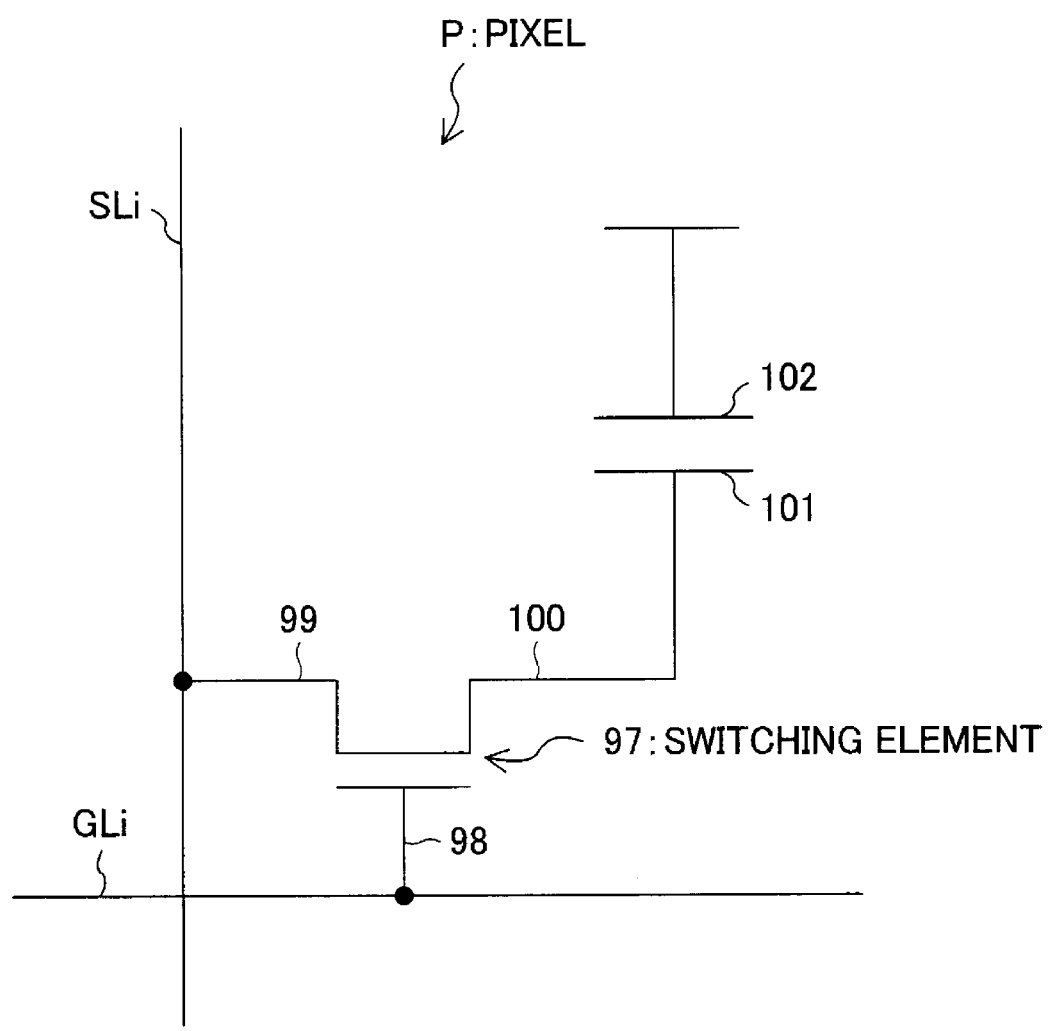
FIG. 4 outlines pixels in the display apparatus of a preferred embodiment of the present invention.

FIG. 3 is a block diagram outlining the display apparatus 1. FIG. 4 is a schematic diagram showing a pixel and its peripherals in the display apparatus 1 shown in FIG. 3.

As shown in FIG. 3, the display apparatus 1 includes a TFT substrate 11 on which pixels P are arranged in a matrix manner, a source driver 94 and a gate driver 95 which are drive circuits, and a power supply circuit 96.

The TFT substrate 11 is provided with plural data signal lines SL1-SLn (n is an integer not less than 2) and plural scanning signal lines GL1-GLm (m is an integer not less than 2) intersecting with the respective data signal lines SL1-SLn. At the respective intersections between the data signal lines SL1-SLn and the scanning signal lines GL1-GLm, the pixels P are provided.

The pixels P are arranged such that pixels displaying an image in the same display direction are provided along the data signal lines SL1-SLn, so as to form a pixel line. More specifically, pixel lines L for the driver's seat (for display for the driver's seat) and pixel lines R for the passenger seat (for display for the passenger seat) are alternately provided in a direction substantially orthogonal to the data signal lines SL1-SLn. To the pixels, drive voltages are supplied (data (signal) is input) by the source driver 94 and the gate driver 95, in such a way that images in accordance with respective display directions are displayed. In the display apparatus 1, the pitch (pixel pitch) between the neighboring pixel lines is preferably about 65 μm, for example.

The control section 91 centrally controls the source driver 94 and the gate driver 95.

The power supply circuit 96 supplies voltages to the source driver 94 and the gate driver 95 in order to allow the display apparatus 1 to perform display. The source driver 94 and the gate driver 95 generate drive voltages (signals, data) for displaying images in accordance with display directions of the pixels P, and drive the data signal lines SL1-SLn and the scanning signal lines GL1-GLm. On the TFT substrate 11, furthermore, electrodes 101 for applying electric fields to the pixels P are provided for the respective pixels P. On the CF substrate 12, electrodes 102 (not illustrated in FIG. 1) are provided.

As shown in FIG. 4, each of the pixels P is provided with a switching element 97. Examples of the switching element 97 include FET (Field Effect Transistor) and TFT (Thin Film Transistor). In the switching element 97, the gate electrode 98 is connected to a scanning signal line GLi (i is an integer not less than 1), the source electrode 99 is connected to a data signal line SLi, and the drain electrode 100 is connected to an electrode 101. The electrodes 102 are connected to a common electrode line (not illustrated) which is shared among all of the pixels P.

Given the above structure, when the scanning signal line GLi is selected in the pixel P, the switching element 97 is turned on and a signal voltage determined based on a display data signal supplied from a controller (not illustrated) is applied, by the source driver 103, to the gap between the electrodes 101 and 102 via the data signal line SLi (i indicates an integer not less than 1). In the gap between the electrodes 101 and 102, ideally the voltage at the time of switch off is retained while the switching element 97 is in the off state after the selection period of the scanning signal line GLi finishes. Drive voltages are independently applied to the gaps between the electrodes 101 and 102 of the pixels P so that electric fields corresponding to images displayed by the pixels are applied to the respective pixel areas in the liquid crystal layer 13 and the orientations of liquid crystal molecules in the pixel areas are changed, with the result that display is carried out.

In the display apparatus 2, the TFT substrate 11 is preferably about 700 µm thick, for example. Also, on the surface on the backlight 30 side of the TFT substrate 11, a polarizing plate 41 is provided. On the opposing surfaces of the TFT substrate 11 and the CF substrate 12, orientation films 14 and 15 are provided, respectively. The orientations of the orientation films 14 and 15 are substantially orthogonal to each other. Details of the orientation films 14 and 15 will be given later.

On the CF (Color Filter) substrate 12, a color filter layer (not illustrated) is provided. The color filter layer is provided with R, G, and B sub-pixels for each pixel. The CF substrate 12 is thinned down by a mechanical process such as chemical etching and grinding to be about 50 µm thick, for example.

The barrier section (barrier substrate) 20 is constituted by a barrier glass 21 and a barrier light shielding layer 22. The barrier glass 21 preferably is transparent glass and about 0.7 mm thick, for example. On the barrier glass 21, the barrier light shielding layer 22 is formed. On the display surface side (opposite side of the backlight 30) of the barrier glass 21, a polarizing plate 42 is provided.

The barrier light shielding layer 22 is provided so that stripes are in parallel to the pixel lines R and L. A non-limiting example of the material of the barrier light shielding layer 22 is photosensitive resin in which a black pigment is dispersed. In the direction that is substantially orthogonal to the pixel lines R and L, the width (barrier width) of the stripes of the barrier light shielding layer 22 preferably is about 40 µm, for example. The interval (barrier pitch) between the neighboring stripes of the barrier light shielding layer 22 preferably is about 129.99 µm, for example.

The stripes of the barrier light shielding layer 22 are arranged to correspond to the respective pixel lines of the display panel 10. In other words, the stripes of the barrier light shielding layer 22 are provided to prevent parts of light, which is emitted from the pixel lines of the display panel 10, from being observable in directions other than the display directions of the pixel lines. On this account, the pixel lines R for the driver's seat are viewable from the driver's seat but are not viewable from the passenger seat, whereas the pixel lines L for the passenger seat are viewable from the passenger seat but are not viewable from the driver's seat. In this manner, the display apparatus 1 can display different images for the driver's seat and the passenger seat, respectively.

The adhesive layer 61 is used for adhering the barrier section 20 to the display panel 10. The adhesive layer 61 preferably is formed on the entirety of the opposing surfaces of the barrier section 20 and the display panel 10. In short, the barrier section 20 and the display panel 10 are entirely adhered to each other. An example of the adhesive layer 61 is an ultraviolet-curing adhesive. In the display apparatus 1, the thickness of the adhesive layer 61 (i.e., the gap between the barrier glass 21 and the CF substrate 12) preferably is about 40 µm, for example.

To properly display images for the driver's seat and the passenger seat, it is necessary to precisely align the barrier section 20 with the display panel 10. It is therefore preferable to perform precise alignment by providing alignment marks on the respective members.

The following will now describe the directions of orientation performed onto the orientation films 14 and 15 and the absorption axis directions of the polarizing plates 41 and 42.

Figure 5A:
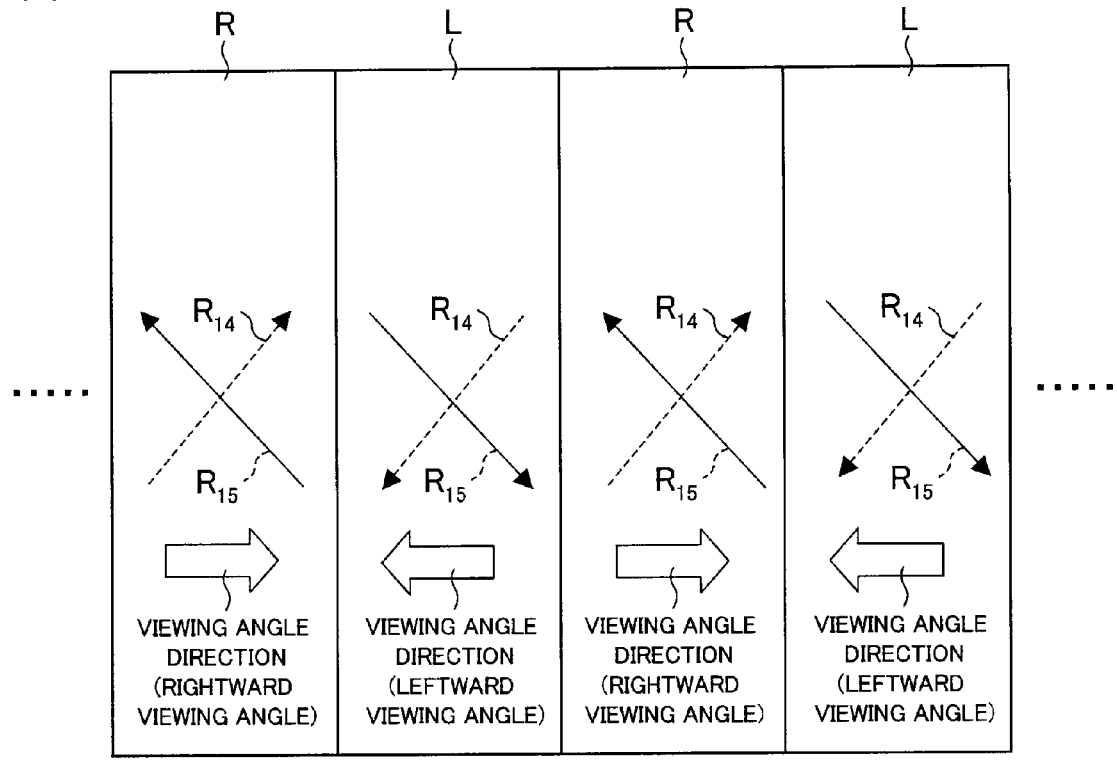
FIG. 5A schematically illustrates an example of directions of rubbing performed onto an orientation film of a display panel of the display apparatus of a preferred embodiment of the present invention.

FIG. 5A schematically shows the rubbing directions (orientation directions) of the orientation films 14 and 15, when the display panel 10 is viewed from the display surface side (from the side opposite to the backlight 30). The rubbing directions correspond to the respective pixel lines. It is noted that, in the figure, the rubbing direction (rubbing axis) of the orientation film 14 is termed R14, whereas the rubbing direction of the orientation film 15 is termed R15.

As shown in the figure, the rubbing directions of the respective orientation films 14 and 14 are substantially orthogonal to each other. The orientation directions of the orientation films are arranged so that the viewing angle directions (visual characteristics) of neighboring pixel lines are opposite to each other. In other words, the pixel lines R for the right side sight and the pixel lines L for the left side sight are alternately provided, i.e. the pixel lines R in which the viewing angle direction heads to the right side (driver's seat side) and the pixel lines L in which the viewing angle direction heads to the left side (passenger seat side) are alternately provided. The rubbing direction of the orientation film 14 is rotated for about 45° with respect to the viewing angle direction of each pixel line, whereas the rubbing direction of the orientation film 15 is rotated for about 135° with respect to the viewing angle direction of each pixel line. As such, the orientation films formed on the TFT substrate 11 and the CF substrate 12 are divided into the TN orientation for the right viewing angle direction and the TN orientation for the left viewing angle direction, in accordance with the pixel lines (areas) which display images for the driver's seat (right side) and the passenger seat (left side), respectively.

Figure 5B:
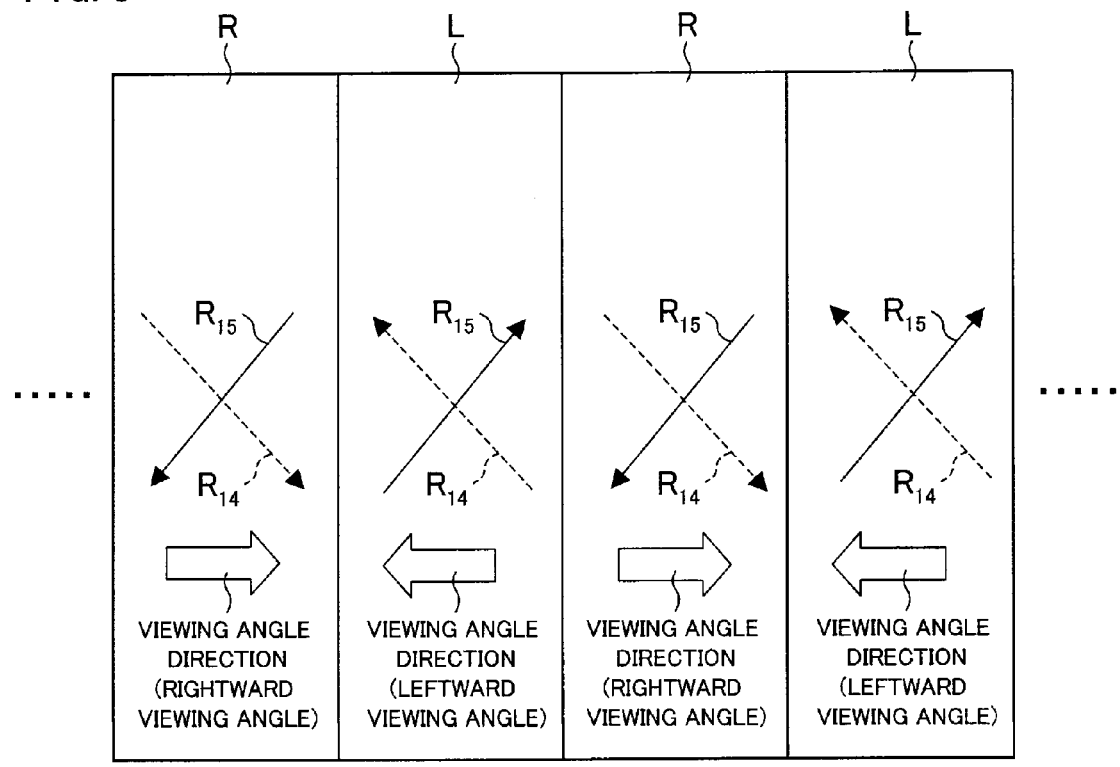
FIG. 5B schematically illustrates an example of directions of rubbing performed onto the orientation film of the display panel of the display apparatus of a preferred embodiment of the present invention.

The rubbing directions of the orientation films 14 and 15 are not limited to those shown in FIG. 5A. For example, as shown in FIG. 5B, rubbing may be performed onto the orientation films 14 and 15 in such a manner that the liquid crystal molecules between the substrates are oriented in the opposite directions to those of FIG. 5A.

That is to say, in the case where the rubbing in the directions shown in FIG. 5A is performed, the liquid crystal molecules between the orientation films 14 and 15 are oriented in a counter-clockwise direction from the orientation film 14 side to the orientation film 15 side (left-handed rotation), in response to an electric field applied to the gap between the substrates. On the other hand, as shown in FIG. 5B, in the case where the rubbing direction of the orientation film 14 is rotated for about 45° with respect to the viewing angle of each pixel line whereas the rubbing direction of the orientation film 15 is rotated for about −135° with respect to the viewing angle direction of each pixel line, the liquid crystal molecules between the orientation films 14 and 15 are oriented in a clockwise direction from the orientation film 14 side to the orientation film 15 side (right-handed rotation), in response to an electric field applied to the gap between the substrates. Also in this case, the viewing angle direction of the pixel line R corresponds to the right side sight and the viewing angle direction of the pixel line L corresponds to the left side sight, as in the case of FIG. 5A.

The absorption axis direction of the polarizing plate 41 is substantially parallel to the orientation direction of the orientation film 14, whereas the absorption axis direction of the polarizing plate 42 is substantially parallel to the orientation direction of the orientation film 15.

The following will describe how the rubbing is performed onto the orientation films 14a and 15a. FIGS. 6A-6E illustrate a rubbing step with respect to the orientation film 15. Although the following deals with the rubbing with respect to the orientation film 15, the same method can be performed for the orientation film 1a, too.

Figure 6E:
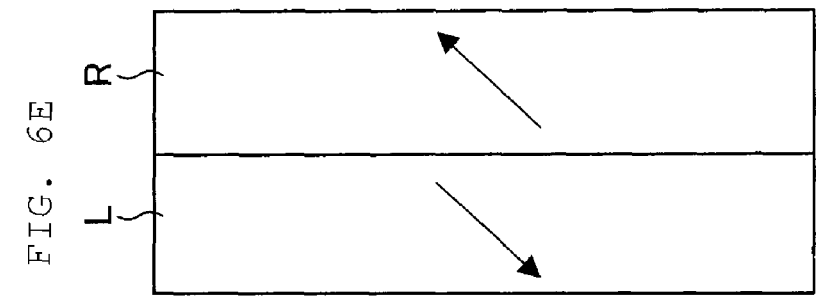
FIGS. 6A-6E show a rubbing process performed on the orientation film of the display panel of the display apparatus of a present preferred embodiment of the present invention.
Figure 6D:
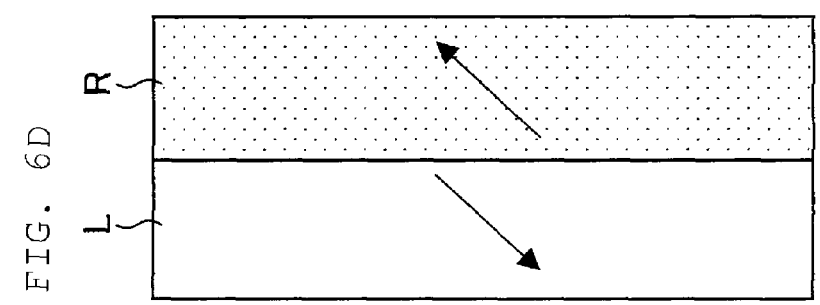
Figure 6C:
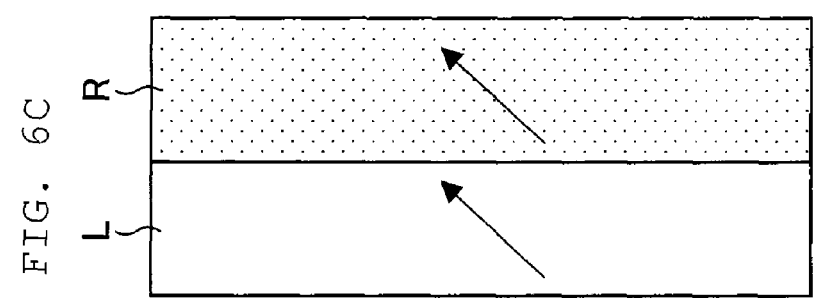
Figure 6B:
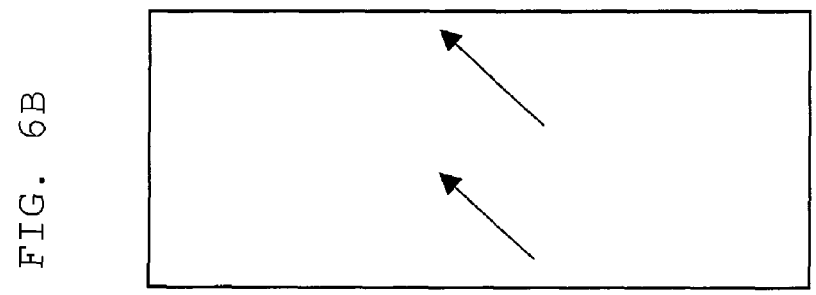
Figure 6A:

FIG. 6A shows a part of the orientation film 14 before the rubbing (un-rubbed orientation film). On the entire surface of the orientation film 14 in this state, as shown in FIG. 6B, rubbing in one direction (i.e., rubbing direction corresponding to any one of the pixel lines) is performed (entire rubbing of the whole surface). In this case, rubbing in the rubbing direction corresponding to the pixel line L is carried out for the all areas (both of the areas corresponding to the pixel line L and the area corresponding to the pixel line R) at once.

Next, as indicated in FIG. 6C, the area corresponding to the pixel line R is masked by resist.

Subsequently, as shown in FIG. 6D, rubbing in the direction different from the rubbing in FIG. 6B is performed with respect to the areas corresponding to the pixel line L (rubbing for non-resist area). In the example shown in FIG. 6D, the rubbing is carried out in the direction anti-parallel to the rubbing direction with respect to pixel line R, i.e. in the direction of rubbing performed in FIG. 6B.

Thereafter, the resist formed on the area corresponding to the pixel line R is removed. As a result, the areas, of the orientation film 14, which correspond to the respective pixel lines are rubbed in accordance with the display directions (viewing angle directions) of the respective pixel lines.

As a result of the rubbing performed onto the orientation films 14 and 15, an oriented area with the viewing angle direction toward the driver; seat (right side) is formed on the pixel area corresponding to the pixel line R for display for the driver's seat, whereas an oriented area with the viewing angle direction toward the passenger seat (left side) is formed on the pixel area corresponding to the pixel line L for display for the passenger seat.

Figure 7:
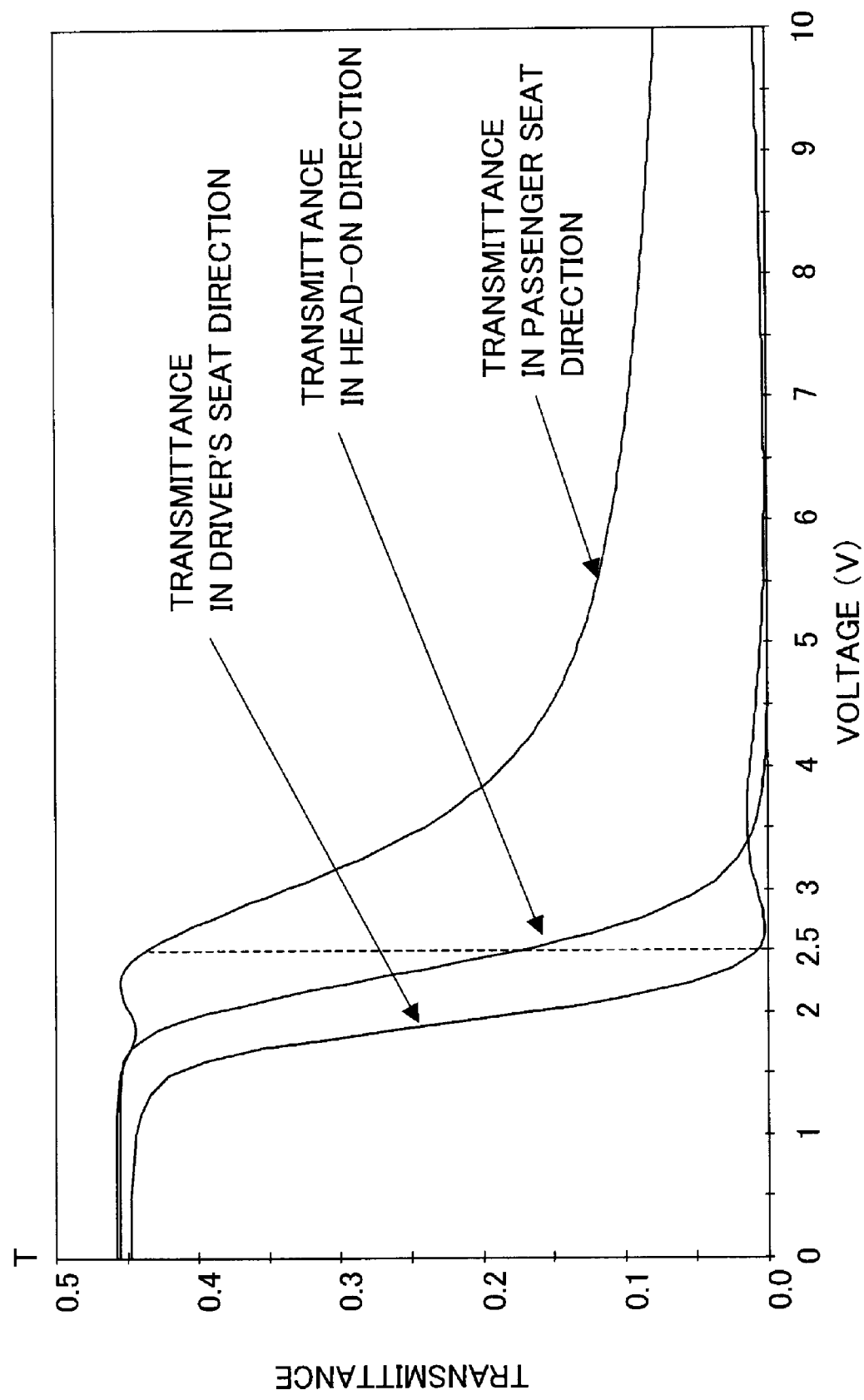
FIG. 7 is a graph showing the relationship between a drive voltage applied to the display panel of the display apparatus of a preferred embodiment of the present invention and transmittance in each display direction.

The following will provide details of the point above. FIG. 7 is a graph showing voltage-transmittance characteristics of the oriented area corresponding to the pixel line L for display for the passenger seat. In this graph, the direction towards the driver's seat is arranged to be about 30° to the right with respect to the display surface, whereas the direction towards the passenger seat is arranged to be about 30° to the left with respect to the display surface. The voltage applied to the gap between the electrodes 101 and 102 has a rectangular wave. Also, the graph assumes that the cell retardation of the display panel 10 is set at about 400 nm (1stmin). The retardation is not particularly limited, and hence the same effects are achievable if the retardation is set at 2ndmin, for example. "1stmin" and "2ndmin" are cell retardation settings at which birefringence disappears and only optical rotation influences on the contrast.

As shown in the figure, as the voltage applied to the gap between the electrodes 101 and 102 is increased, the transmittance for the driver's seat is substantially null at the voltage of about 2.5V. In the meanwhile, the transmittance for the passenger seat at this voltage is substantially identical with the transmittance with no voltage application. It is also noted that the difference in the transmittance between for the driver's seat and for the passenger seat is maximized when the voltage applied to the gap between the electrodes is about 2.5V.

FIG. 7 shows the voltage-transmittance characteristics of the oriented area corresponding to the pixel line L. The voltage-transmittance characteristics of the oriented area corresponding to the pixel line R are worked out by interchanging the transmittance for the driver's seat with the transmittance for the passenger seat, in FIG. 7.

In the display apparatus 1, the drive voltage applied to the gap between the electrodes 101 and 102 when image display is performed is a halftone voltage. The halftone voltage is a voltage with which the transmittance in the anti-viewing angle direction is substantially zero (i.e. transmitted light is not recognized) whereas the transmittance in the viewing angle direction is kept high (i.e., an image displayed for the passenger seat is suitably viewable). With this, light emitted from each pixel line can be easily emitted in the display direction (viewing angle direction) of the pixel line but cannot be easily emitted in a different display direction (anti-viewing angle direction).

Then images displayed by the display apparatus 1 will be discussed. First, in the case where different images are displayed for the driver's seat and the passenger seat (i.e., in the case where display for the driver's seat is not set to non-display) will be discussed. FIG. 8 shows the display in this case.

As discussed above, the display apparatus 1 is arranged such that an oriented area (TN oriented area) having the viewing angle direction toward the driver's seat (right side) is provided at the pixel area corresponding to the pixel line R by which display for the driver's seat is performed, whereas an oriented area having the viewing angle direction toward the passenger seat (left side) is provided at the pixel area corresponding to the pixel line L by which display for the passenger seat is performed. In other words, orientations are determined so that light from the pixel lines is easily emitted in the display directions (viewing angle directions) of the respective pixel lines but is hardly emitted in different display directions (anti-viewing angle directions).

With the arrangement above, the separation capability of image light emitted from the barrier section 20 is significantly improved in all display directions. To put it differently, in the display apparatus 1, the pixel areas are oriented so that the pixel areas for the left side function as display areas (TN areas) having the viewing angles for the left side whereas the pixel areas for the right side function as display areas (TN areas) having the viewing angles for the right side. As a result, the crosstalk prevention capability is significantly improved by the orientation division which prompts light to travel in desired directions, in addition to the image light separation capability of the barrier section 20. As a result, for both the driver's seat and the passenger seat, high-quality images with lower crosstalk can be displayed.

Figure 9A:
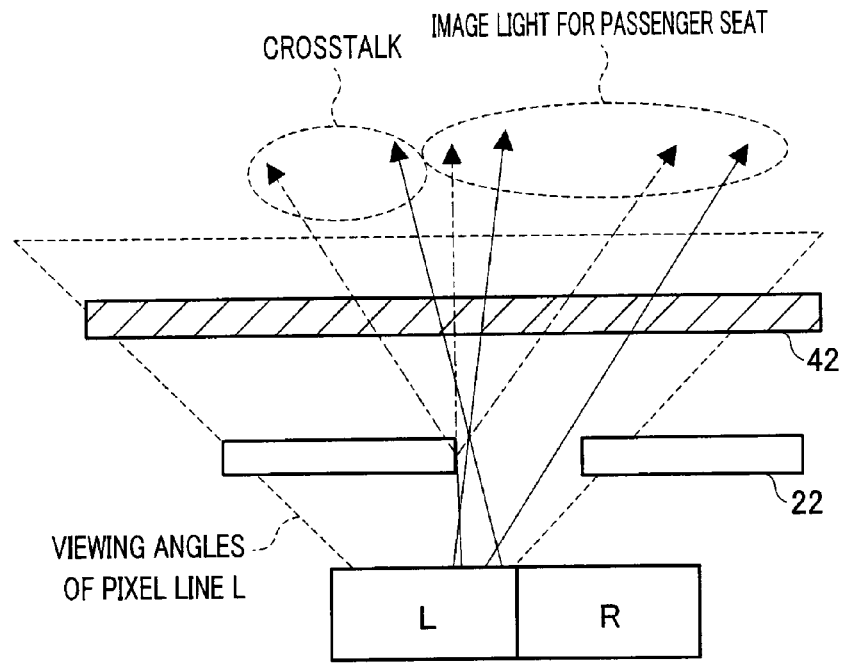
FIG. 9A illustrates viewing angle characteristics in the case where a display panel without orientation division is adopted.

Details of the point above will be given with reference to FIGS. 9A and 9B. FIG. 9A shows the viewing angles of the pixel line L for the left side (pixels for the left) in the case where the display panel 10 with no orientation division is adopted, i.e., for all pixel lines, the viewing angle direction is set to the vertical direction with respect to the surface of the figure (uniaxial setting).

In the display panel with such a viewing angle direction, as shown in FIG. 9A, the viewing angle characteristics are substantially equal in both the right side and left side (driver's seat side and the passenger seat side). For this reason, image light is emitted from the pixels (pixel lines) substantially equally in all display directions (both for the driver's seat and the passenger seat). Then, as shown in FIG. 9A, among the image light emitted from the pixel lines L for the passenger seat, for example, image light heading to the driver's seat is blocked by the barrier light shielding layer 22 so that separation of image light is achieved. As such, light separated only by the separation capability of the barrier section 20 is emitted.

In other words, since the areas corresponding to the respective pixels for the driver's seat and the passenger seat have substantially bilaterally symmetrical viewing angles, the pixel lines L for the left side, which provide desired image light to the passenger seat, equally emit light to the driver's seat as well as the passenger seat. In this case, even if separation of image light is possible by means of the barrier section 20, a part of image light for the left side is emitted as light heading to the driver's seat, on account of reasons such as scattering and diffraction of light at the end surface of the barrier light shielding layer 22. A part of the image light for the passenger seat is therefore leaked toward the driver's seat, and hence crosstalk occurs. Crosstalk similarly occurs in the passenger seat direction, too. Therefore, crosstalk may be conspicuous and visibility may be decreased in some display patterns.

Figure 9B:
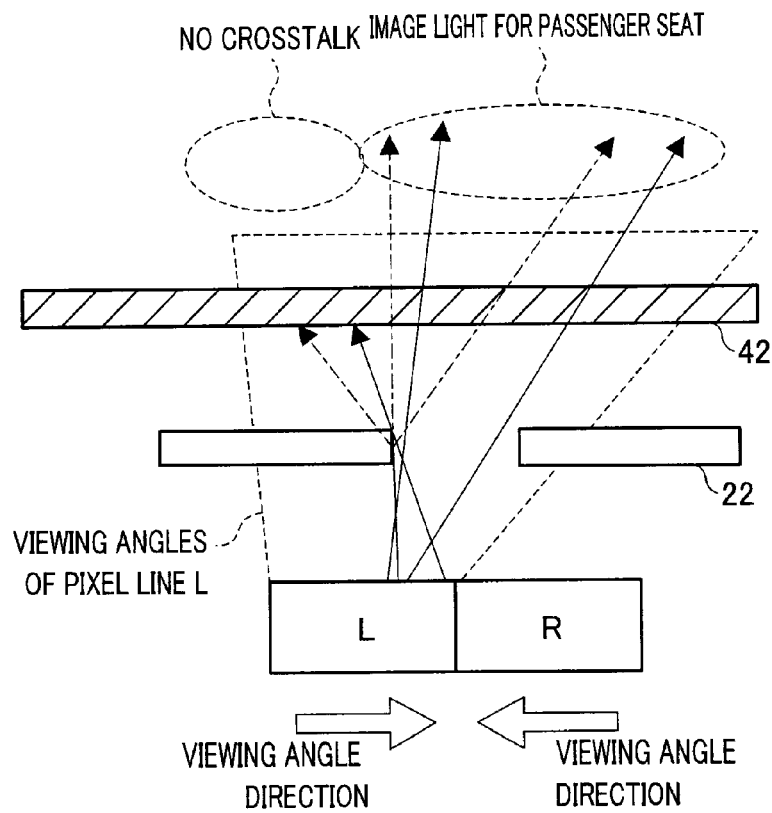
FIG. 9B illustrates viewing angle characteristics of the display panel of the display apparatus of a preferred embodiment of the present invention.
Figure 11:
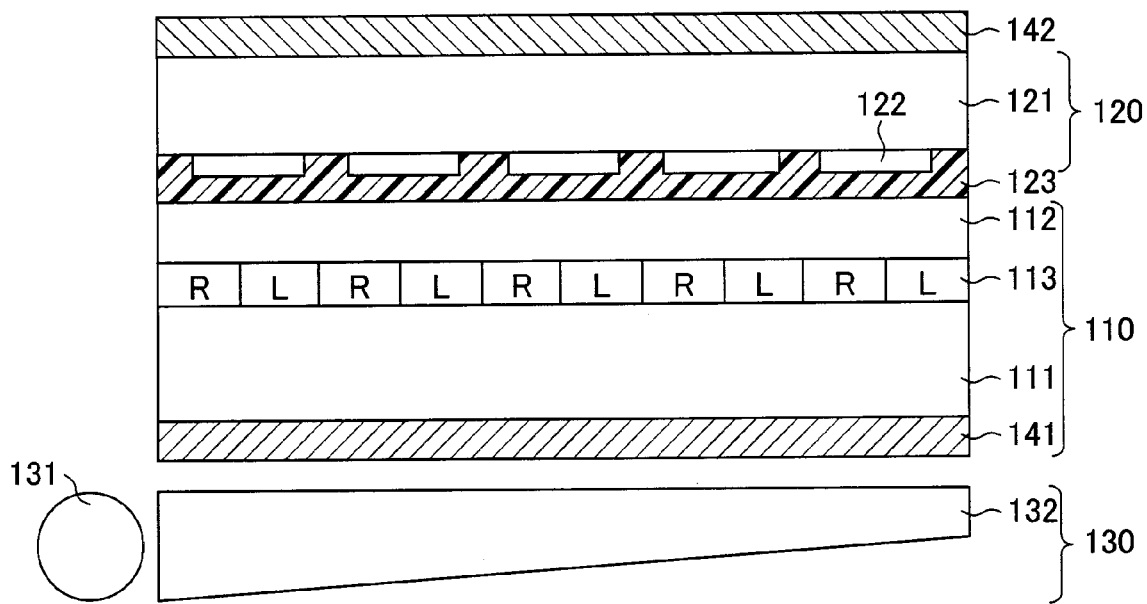
FIG. 11 is a schematic cross section showing an arrangement of a conventional DV display apparatus.

In the meanwhile, FIG. 9B shows the viewing angles of the pixel lines L for the left side (pixels for the left) of the display apparatus 1, i.e., the viewing angles of the pixel lines L for the left side, in the display panel 10 with orientation division.

In the display apparatus 1, the areas corresponding to the pixels for the right and the pixels for the left are oriented so as to correspond to the right viewing angles and the left viewing angles, respectively. On this account, for example, light emitted from the pixel lines L for the left side preferentially heads to the passenger seat, on account of the viewing angle characteristic thereof. Furthermore, since the traveling direction of a component of scattered/diffracted light which causes crosstalk is in parallel to the anti-viewing angle direction, the component is hardly emitted from the display apparatus 1, and hence unnecessary light leakage is small. It is therefore possible to suitably display images with reduced cross talk, for both the driver's seat and the passenger seat.

The following will describe display on the display apparatus 1 in the case where display for the driver's seat is set to non-display. FIG. 10 illustrates display on the display apparatus 1 in this case.

Being similar to the case of FIG. 9B, among scattered/diffracted light emitted from each pixel line, a component traveling in the anti-viewing angle direction is reduced by orientation division of the display panel 10, in the case where display for the driver's seat is set to non-display in the display apparatus 1. In other words, among scattered/diffracted light in image light used for performing display for the passenger seat, it is possible to restrain a component heading to the driver's seat from being emitted from the display apparatus 1.

On this account, in the display apparatus 1, it is possible to effectively prevent image light for the passenger seat from leaking to the driver's seat side on account of crosstalk, in the case where display for the driver's seat is set to non-display, as shown in FIG. 10. In other words, in the case where display in one display direction is set to non-display, typically crosstalk of image light to another display direction is particularly visible, but the display apparatus 1 can prevent or restrain such crosstalk from being visible. Furthermore, since crosstalk is reduced also for the passenger seat, the quality of display for the passenger seat is improved, too.

As described above, in the display apparatus 1, orientations of the pixels (pixel lines) for displaying images for the driver's seat and the passenger seat, respectively, are determined (orientation division is performed) in accordance with the display directions. In other words, in accordance with the pixels (pixel areas) for display in the right side and display in the left side in the display panel 10, orientation division is performed for the pixels so that an oriented area with the viewing angle direction towards the left side is formed for the pixel area for the left whereas an oriented area with the viewing angle direction towards the right side is formed for the pixel area for the right. As a result, the pixels have viewing angle directions (viewing angle characteristics) in accordance with the display directions. Light from the pixels therefore has outgoing light characteristics such that light is easily emitted in the display directions of the pixels, but are not easily emitted in other display directions.

With this, crosstalk is reduced in all display directions, on account of orientation division by which light is prompted to travel in desired directions, in addition to the separation capability of image light by the barrier section 20 (parallax barrier). In other words, in addition to the parallax barrier, orientation division is performed for the display panel 10 so that respective areas acquire desired viewing angle directions, and hence the separation capability of images is significantly improved for both the driver's seat and the passenger seat.

Therefore in the case where different images are displayed for the driver's seat and the passenger seat, images with reduced crosstalk are suitably displayed for both the driver's seat and the passenger seat. In other words, the crosstalk prevention capability is significantly improved both for the driver's seat and the passenger seat, and hence the viewability is improved.

Furthermore, also in the case where display for the driver's seat is set to non-display and an image is displayed only for the passenger seat, among scattered/diffracted light of image light traveling towards the passenger seat, a component traveling towards the driver's seat is reduced by orientation division. It is therefore possible to prevent image light for the passenger seat from leaking to the driver's seat side which is set to non-display or black display. The safety of driving is improved by, for example, setting display for the driver's seat to non-display while the vehicle is running.

In the present preferred embodiment, the rubbing directions of the areas in the orientation films 14 and 15 are preferably arranged as shown in FIG. 5. Not being limited to this, the viewing angle directions (viewing angle characteristics) of the respective areas may be arranged so as to correspond to the display directions of the areas.

As discussed above, while the vehicle is running, display for the driver's seat is not carried out and display is performed only for the passenger seat. That is to say, in the display apparatus 1, the control section 91 controls the sections and electrically changes the display, in such a manner as to cause the display apparatus to function as a DV display apparatus performing display for both the driver's seat and the passenger seat when the vehicle does not move, and cause the display apparatus to function as a single-view display apparatus performing display only for the passenger seat when the vehicle is running. As a result, it is possible to prevent the driver from losing attention to driving, so as to improve the safety.

Switching of display between the running state and non-running state (stop state) may be performed by the control section 91 in response to an instruction input from the user via an input device (not illustrated). Alternatively, the vehicle may be provided with a detector which detects whether the vehicle is running, and the switching may be performed by the control section 91 in consideration of the detection result. An example of the detector is a speed sensor of the vehicle.

In the display apparatus 1, display for the driver's seat is not performed and display is performed only for the passenger seat, when the vehicle is running. This arrangement, however, is not always appropriate. For example, a detector detecting whether driving is possible may be provided and the control section 91 may switch the display in response to the detection result. Examples of such a detector include a gear shift position sensor and a sensor which detects the state of the parking brake.

Although the display apparatus 1 of the present preferred embodiment preferably is an in-vehicle display apparatus, the use of the display apparatus is not limited to this. For example, the display apparatus 1 may be broadly adopted to television receivers, monitors, OA (Office Automation) equipments such as word processors and personal computers, video cameras, digital cameras, information terminals such as mobile phones, or the like. Moreover, since different images can be displayed for plural directions, the display apparatus 1 may be suitably used for versus-type video games and multiplayer video games.

Examples of the sizes of the sections of the display apparatus 1 are specified in the present preferred embodiment. The sizes, however, are not limited to the above, and may be suitably determined in consideration of the use of the display apparatus, for example.

In the present preferred embodiment, the direction to the driver's seat is set at about 30° to the right with respect to the display surface and the direction toward the passenger seat is set at about 30° to the left with respect to the display surface, as shown in FIG. 6. However, the angles of these directions with respect to the display surface are not limited to the above. The angles of the display directions with respect to the display surface may be suitably determined in consideration of the position of the display apparatus in the vehicle, the setting angle, or the like.

In the display apparatus 1, the pixel lines R (display area for the driver's seat) for the driver's seat and the pixel lines L (display area for the passenger seat) for the passenger seat are alternately disposed. However, the display areas for the respective directions may be differently arranged. For example, the display areas may be arranged in units of pixels, or in units of sub-pixels in the color filter layer provided on the color filter substrate 12. In these cases, orientations of the orientation films 14 and 15 are determined in such a manner that the visual directions of the respective areas correspond to the display directions of the respective areas.

The display apparatus 1 is arranged so that different images are displayed in the driver's seat direction and the passenger seat direction, respectively. Alternatively, different images may be displayed in three or more directions, respectively. In this case, orientations of the orientation films 14 and 15 are determined in such a manner that the visual directions of the respective areas correspond to the display directions of the respective areas.

As described above, a display apparatus according to a preferred embodiment of the present invention includes a display device in which plural pixels for displaying images in predetermined directions are disposed in a predetermined order in accordance with the directions of displaying the images; and a light shielding member arranged to prevent light emitted from the pixels from being viewed in directions different from the display directions of the pixels, the display device including a pair of substrates opposing each other; a liquid crystal layer sandwiched between the pair of substrates; an orientation member arranged to orient liquid crystal molecules constituting the liquid crystal layer; and an electrode arranged to apply electric fields corresponding to images, which are displayed by the pixels, to areas of the liquid crystal layer, the areas corresponding to the pixels, and the orientation member orienting the liquid crystal molecules in the areas so that the display directions of the pixels are substantially parallel to a viewing angle direction.

According to the arrangement above, the pixels of the display device have a viewing angle direction corresponding to the display directions of the respective pixels. In other words, the areas, of the liquid crystal layer, which correspond to the respective pixels are provided so that the display directions of the pixels are parallel or substantially parallel to the viewing angle direction. Consequently, light emitted from the pixels can be easily emitted in the display direction of the pixels but cannot be easily emitted in other display directions. As a result, crosstalk is reduced in all display directions on account of the orientation division which prompts light to travel in desired directions, in addition to the separation capability of image light by the light shielding member. In short, the display quality is improved in all display directions and hence the visibility is improved.

It may be arranged so that the liquid crystal layer is made of nematic liquid crystal, the electrode is provided on the liquid crystal layer so as to apply the electric fields along normal of surfaces of the pair of substrates, and the orientation member is provided on opposing surfaces of the pair of substrates and oriented in directions substantially perpendicular to each other. In other words, the display device may be so-called TN (Twisted Nematic) liquid crystal display device.

In TN liquid crystal display device, the viewing angle characteristics when an electric field is applied to the liquid crystal layer significantly vary depending on directions in which the display surface is viewed. In other words, in the TN liquid crystal display device, a difference between the transmittance in the viewing angle direction and the transmittance in the anti-viewing angle direction is great.

Therefore, according to the arrangement above, the image separation capability is improved in all display directions by adopting a TN liquid crystal display device and performing orientation division in such a manner that areas, of the liquid crystal layer, which correspond to the respective pixels are arranged so that the display directions of the respective pixels are parallel or substantially parallel to the viewing angle direction.

It may be arranged so that a drive voltage applied to the electrode in order to display images by the pixels of the liquid crystal layer is a halftone voltage. In this specification, the halftone voltage is a voltage with which the liquid crystal molecules of the liquid crystal layer are oriented such that the transmittance in the anti-viewing angle direction is low so that transmitted light is not recognized, whereas the transmittance in the viewing angle direction is kept high so that an image displayed in the viewing angle direction is suitably viewable.

According to the arrangement above, a difference between the transmittance in the viewing angle direction and the transmittance in the anti-viewing angle direction is very large. It is therefore possible to improve the image separation characteristics in all display directions.

The display apparatus may display different images in two different directions, and may be arranged such that the orientation members orient the liquid crystal molecules in the areas in such a manner that the display directions of the pixels are parallel or substantially parallel to the viewing angle direction whereas another display direction different from the display directions of the pixels is parallel or substantially parallel to an anti-viewing angle direction.

This display apparatus displays different images in two different directions, and in the display apparatus, orientation division is performed so that areas, of the liquid crystal layer, which correspond to respective pixels are arranged to have a viewing angle in parallel to the display directions of the pixels and an anti-viewing angle which is the another display direction. On this account, light emitted from the pixels can be easily emitted in the display directions of the pixels but cannot be easily emitted particularly in another display direction. This makes it possible to properly restrain image light in the display directions from leaking to another display direction.

It may be arranged so that a controller arranged to switch a display state by controlling a drive voltage applied to the electrode, in such a manner that at least one of the display directions is set to non-display and image display is performed only for the remaining display direction, is further provided.

In a conventional display apparatus which displays different images in plural display directions, crosstalk may occur in one display direction because scattered/diffracted light of image light for another display direction leaks to the one display direction. In the case where crosstalk occurs in a display direction to which display is set to non-display, the crosstalk image is particularly visible.

In regard to this problem, according to the arrangement above, among scattered/diffracted light in image light in display directions, a component traveling in a direction other than the display directions of the image light is reduced. It is therefore possible to reduce leakage of scattered/diffracted light of image light to a display direction to which display is set to non-display, from another display direction. This prevents or restrains crosstalk from being viewed in a display direction to which display is set to non-display and hence crosstalk is particularly visible.

The display apparatus may be an in-vehicle display apparatus displaying different images in the respective display directions including a driver's seat direction, and the controller may switch the display state so that the driver's seat direction is set to non-display.

According to this arrangement, in the case where display for the driver's seat is set to non-display, a component traveling in the driver's seat direction is reduced among light generated by scatter/diffraction of image light in another display direction. In other words, it is possible to prevent or restrain crosstalk from occurring because, to the driver's seat direction to which display is set to non-display, image light in another display direction leaks. Therefore, for example, display for the driver's seat is set to non-display while the vehicle is running or the driver is driving the vehicle, so that image light in the other directions is prevented from being viewed in the driver's seat direction. As a result, it is possible to prevent the driver from losing attention to driving, so as to improve the safety.

The preferred embodiments and specific examples of implementation discussed in the foregoing detailed explanation serve solely to illustrate the technical details of the present invention, which should not be narrowly interpreted within the limits of such preferred embodiments and specific examples, but rather may be applied in many variations within the spirit of the present invention.

The display apparatus according to various preferred embodiments of the present invention may be broadly adopted as display apparatuses of moving apparatuses such as vehicles, television receivers, monitors, OA (Office Automation) equipments such as word processors and personal computers, video cameras, digital cameras, information terminals such as mobile phones, or the like. The display apparatus of the present invention is suitably used in-vehicle display apparatuses and display apparatuses for versus-type video games and multiplayer video games, because different images can be displayed in different display directions, with a high image separation capability. Also, the display apparatus according to various preferred embodiments of the present invention is particularly suitable for in-vehicle displays, because, when display for one direction is set to non-display and display is performed only for the other direction, it is possible to prevent the image for the other direction from being displayed for the non-display direction due to crosstalk.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display apparatus, comprising:
   a display device in which plural pixels for displaying images in predetermined directions are disposed in a predetermined order in accordance with the directions of displaying the images; and
   a light shielding member arranged to prevent light emitted from the pixels from being viewed in directions different from the display directions of the pixels; wherein the display device includes:
   a pair of substrates opposing each other;
   a liquid crystal layer sandwiched between the pair of substrates;
   an orientation member arranged to orient liquid crystal molecules constituting the liquid crystal layer; and
   an electrode arranged to apply electric fields corresponding to images, which are displayed by the pixels, to areas of the liquid crystal layer, the areas corresponding to the pixels; wherein
   the orientation member orients the liquid crystal molecules in the areas so that the display directions of the pixels are substantially parallel to a viewing angle direction.

2. The display apparatus as defined in claim 1, wherein the liquid crystal layer is made of nematic liquid crystal, the electrode is arranged on the liquid crystal layer so as to apply the electric fields along normal of surfaces of the pair of substrates, and the orientation member is provided on opposing surfaces of the pair of substrates and oriented in directions substantially perpendicular to each other.

3. The display apparatus as defined in claim 1, wherein a drive voltage applied to the electrode in order to display images by the pixels of the liquid crystal layer is a halftone voltage.

4. The display apparatus as defined in claim 1, wherein the display apparatus displays different images in two different directions and the orientation member orients the liquid crystal molecules in the areas in such a manner that the display directions of the pixels are substantially parallel to the viewing angle direction whereas another display direction different from the display directions of the pixels is substantially parallel to an anti-viewing angle direction.

5. The display apparatus as defined in claim 1, further comprising a controller arranged to switch a display state by controlling a drive voltage applied to the electrode in such a manner that at least one of the display directions is set to nondisplay and image display is performed only for the remaining display direction.

6. The display apparatus as defined in claim 5, wherein the display apparatus is an in-vehicle display apparatus displaying different images in the respective display directions including a driver's seat direction, the controller being able to switch the display state so that the driver's seat direction is set to non-display.

7. The display apparatus as defined in claim 1, wherein the orientation member orients the liquid crystal molecules by a difference of 180 degrees for each of the areas in which the display direction differs.

* * * * *